Figure 1:
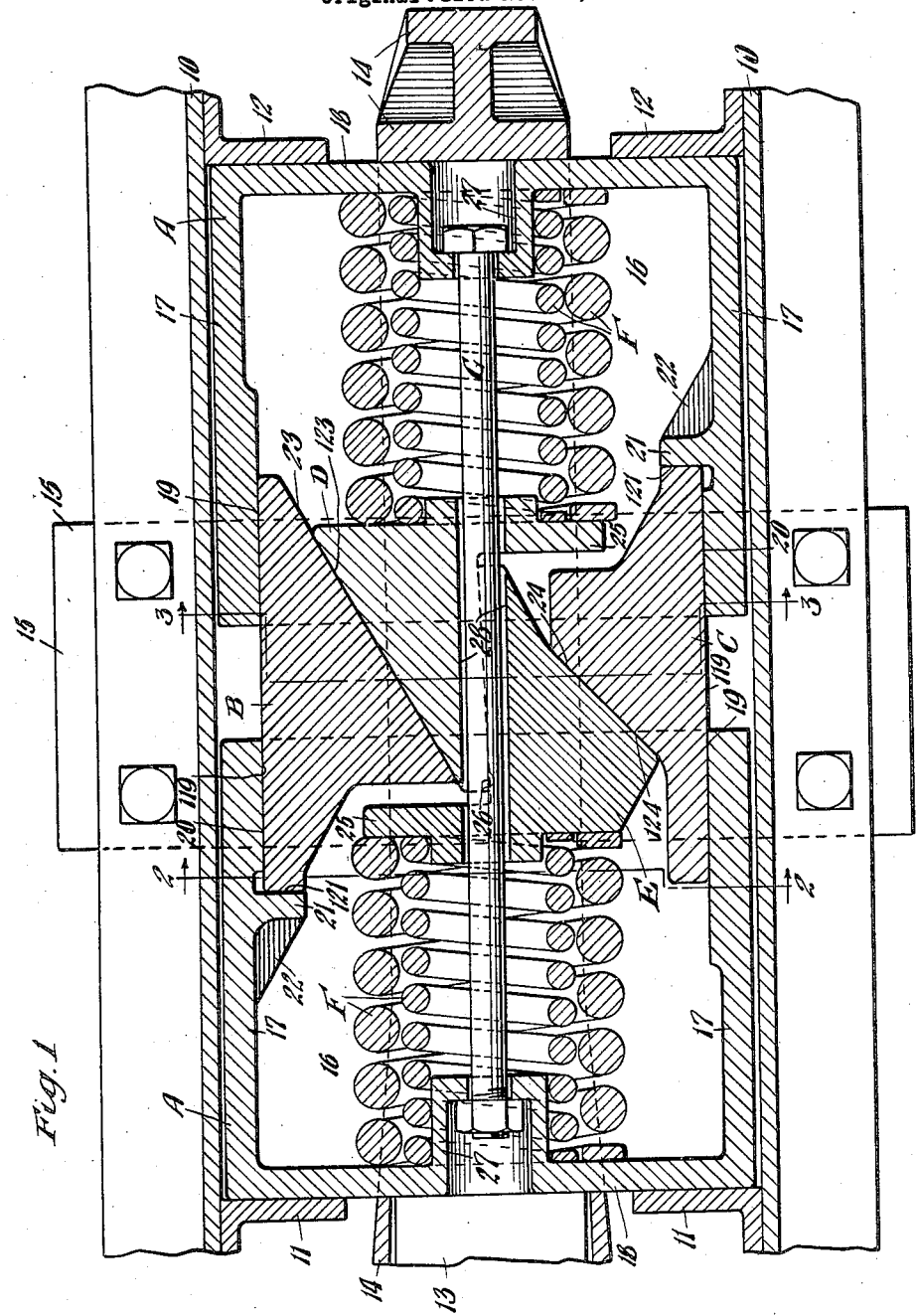

June 26, 1928.                                                    1,674,873
J. F. O'CONNOR
FRICTION SHOCK ABSORBING MECHANISM
Original Filed Nov. 23, 1925     2 Sheets-Sheet 2
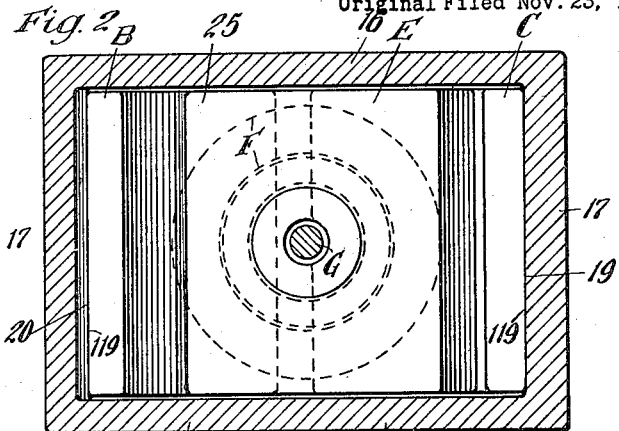
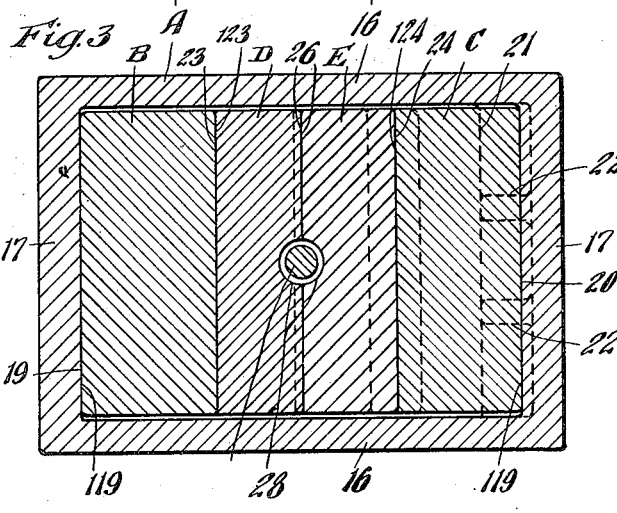
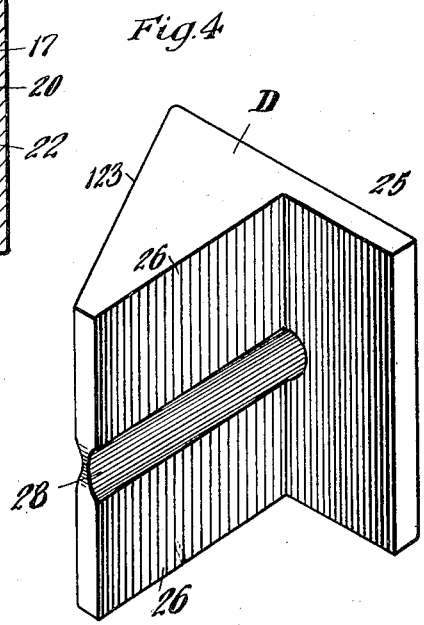
Witness
Wm. Geiger
Inventor
John F. O'Connor
By George D. Haight
His Atty.

Patented June 26, 1928.

1,674,873

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed November 23, 1925, Serial No. 70,751. Renewed February 16, 1928.

This invention relates to improvements in friction shock absorbing mechanisms.

One object of the invention is to provide a friction shock absorbing mechanism, especially adapted for railway draft riggings, having high capacity, together with assured release, employing a friction wedge system including a plurality of elements having co-operating wedging engagement with each other, wherein certain of said elements have co-operating friction surfaces inclined with reference to the direction of the applied force to provide for differential action during the compression stroke of the mechanism.

Another object of the invention is to provide a mechanism of the character indicated, employing a friction system including wedge elements and friction elements, wherein the wedge elements and friction elements have co-operating sets of faces, some of which are disposed at relatively keen wedge acting angles with respect to the direction of the applied force and others of which are disposed at relatively blunt angles to said direction to facilitate release and wherein certain of said elements have co-operating faces inclined with respect to the line of applied force to effect a differential action.

A still further object of the invention is to provide a friction shock absorbing mechanism of the double ended type, including front and rear friction shells, a spring resistance, a friction system co-operating with the shells, comprising friction elements and wedge elements, wherein the wedge elements have co-operating surfaces inclined with respect to the longitudinal axis of the mechanism to provide for a differential action.

Other objects and advantages of the invention will more clearly appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. And Figure 4 is a detailed perspective view of a wedge element employed in connection with my improved shock absorbing mechanism.

In said drawings, 10—10 indicate channel-shaped center or draft sills of a railway car underframe, to the inner faces of which are secured front stop lugs 11—11 and rear stop lugs 12—12. The inner end of the drawbar is designated by 13 to which is operatively connected a yoke 14 of well-known form. The shock absorbing mechanism proper is disposed within the yoke and the yoke is supported in operative position by a detachable saddle plate 15 fixed to the draft sills.

The improved shock absorbing mechanism proper, as shown, comprises broadly front and rear follower casings A—A; two friction shoes B and C; two wedge blocks D and E; front and rear spring resistance elements F—F; and a retainer bolt G.

The follower casings A which are of like design each have horizontally disposed, spaced top and bottom walls 16—16, longitudinally disposed, spaced side walls 17—17 and a transverse outer end wall 18. The end wall 18 co-operates with the corresponding stop lugs in the manner of the usual follower. One of the side walls 17 of each shell is provided with a longitudinally disposed interior friction surface 19 on the inner side thereof, while the opposed side wall of the casing is provided with a flat, longitudinally disposed abutment face 20. The side wall 17, provided with the abutment face 20, has a vertically disposed abutment flange 21 inwardly of the face 20, the flange 21 being reinforced by webs 22. As most clearly shown in Figure 1, the front and rear casings A are reversely arranged, so that the friction surface 19 at the one side of the front casing and the abutment face 20 of the rear casing are disposed at the same side of the mechanism and the abutment face 20 of the front casing and the friction surfaces 19 of the rear casing are disposed at the opposite side of the mechanism.

The friction shoes B—C, which are two in number, are disposed at opposite sides of the mechanism. The shoes B and C are of substantially the same design, except as hereinafter pointed out, each shoe having a longitudinally disposed outer flat surface 119 adapted to co-operate with the friction surface 19 of one of the casings A and adapted to bear on the abutment surface 20 of the outer casing. At the inner end, each shoe has a flat transverse face 121 adapted to bear on the corresponding abutment flange 21 of one of the casings. On the inner side, each shoe is provided with a wedge face adapted to cooperate with one of the wedge blocks, the wedge face of the shoe B being designated by 23 while the wedge face of the shoe C is designated by 24. The wedge face 23 of the shoe B is disposed at a relatively keen true wedge acting angle with respect to the longitudinal axis of the mechanism, while the face 24 of the shoe C is disposed at a relatively blunt releasing angle with respect to said axis.

The wedge blocks D and E are of substantially the same design except as hereinafter pointed out. Each wedge block D has a lateral flange 25 at the inner end thereof presenting a flat end face which is in alignment with the flat end face at the inner end of the corresponding wedge. On the outer side each wedge block is provided with a wedge face. The wedge face of the block D is designated by 123 and is correspondingly inclined to and is adapted to cooperate with the keen wedge face 23 of the friction shoe B, while the wedge face of the block E is designated by 124 and is correspondingly inclined to and is adapted to cooperate with the blunt wedge face 24 of the shoe C. On the inner side, each block has a longitudinally disposed flat friction surface 26 adapted to cooperate with a corresponding friction surface 26 on the outer block. As most clearly shown in Figure 1, the cooperating surfaces 26—26 of the wedge blocks D and E are so inclined with reference to the longitudinal axis of the mechanism that the blocks will be forced laterally apart when the block D is forced rearwardly with reference to the block E.

The spring resistance elements F are two in number, one element being disposed at the front end of the mechanism and the other at the rear end. Each spring resistance element comprises an inner, relatively light coil and an outer heavier coil. The opposite ends of the coils of each spring resistance bear respectively on the transverse end wall 18 of one of the casings A and the inner end of one of the wedge members, the front spring resistance element bearing on the wedge member E and the rear spring resistance element bearing on the wedge member D.

The mechanism is held of overall uniform length and in assembled relation by the retainer bolt G which has its opposite ends anchored to the front and rear casings A respectively, the head and nut of the bolt being accommodated respectively in hollow bosses 27 projecting inwardly from the end walls 18 of said casings. The shank of the bolt extends through aligned openings in the wedge blocks D and E, the inner sides of the block being grooved as indicated at 28. The retainer bolt in addition to holding the parts assembled, also serves to maintain the mechanism under a predetermined initial compression.

Compensation for wear of the various friction and wedge faces is had by the expansive action of the spring resistance elements F, which as hereinbefore pointed out are under initial compression. To permit the necessary relative movement of the parts to compensate for wear of these faces, clearance is left between flanges 25 of the wedge blocks D and E, and the opposite ends of these blocks and the shoes.

The operation of my improved shock absorbing mechanism, assuming a compression stroke, is as follows: The front and rear follower casings A will be moved relatively toward each other, compressing the main spring resistance elements F and forcing the shoe associated with one casing A rearwardly with reference to the shoe associated with the other casing. During the described movement of the parts, a wedging action will be set up between the shoe B and wedge D due to the keen co-acting wedge faces thereof, thereby placing all of the parts under lateral pressure. Due to the relatively blunt co-acting wedge faces of the shoe C and wedge block E, there will be substantially no wedging action between these parts during compression of the mechanism, but these blunt faces will accommodate lateral slippage of the shoe C and wedge block E with reference to each other to accommodate the differential action of the mechanism. The differential action referred to is effected by relative movement of the wedge blocks D and E longitudinally of the mechanism during compression, the wedge block D being carried with the shoe B, slipping on the inclined faces of the co-acting wedge block E, which is in engagement with the blunt shoe C. It will be evident that the friction wedge system comprising the wedge blocks D and E, and the shoes B and C will be elongated longitudinally due to the differential action, thereby placing the front and rear springs F under additional compression. The described action will continue either until the actuating pressure is reduced or the inner ends of the casings A come into engagement, whereupon the forces will be transmitted directly through the casings to the stop lugs of the draft sills relieving the springs from excessive pressure. When the actuating force is reduced, the springs F will effect restoration of all of the parts to normal position. The springs will force the wedge blocks inwardly toward each other, carrying the shoes B and C therewith, until movement thereof is limited by engagement with the flanges 21 of the front and rear casings A respectively. Due to the relatively blunt cooperating faces on the wedge block E and the shoe C, the wedge blocks will be squeezed out from between the shoes during release of the mechanism, thereby relieving the pressure on the cooperating keen wedge faces and greatly facilitating the releasing operation.

In addition to facilitating release of the mechanism, the blunt and keen angle arrangement of co-acting wedge faces also effectively prevents the sticking of the elements of the wedge system during compression.

It will be evident that my invention is not limited to the arrangement of blunt and keen wedge faces hereinabove described, but that it is within the scope of the invention to so arrange the wedge faces that all of the same will be disposed at the same angle with reference to the longitudinal axis of the mechanism.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with front and rear relatively movable follower casings having interior longitudinally disposed friction surfaces; of front and rear spring resistance elements; a friction system co-operating with said casings, said system being interposed between said front and rear spring resistance elements, said system including a plurality of friction elements having wedge faces and cooperating wedge elements, certain of said elements being engaged respectively by said follower casings and moved in unison with said casings respectively relatively to each other, said friction elements engaging the friction surfaces of the casings, and said wedge elements having cooperating friction surfaces inclined with reference to the direction of applied force.

2. In a friction shock absorbing mechanism, the combination with front and rear relatively movable casings having longitudinally disposed interior friction surfaces; of a plurality of friction elements each having a wedge face, said elements being arranged in sets, certain elements of said sets having co-acting friction surfaces disposed at an inclination to the longitudinal axis of the mechanism and having the wedge faces thereof co-operating with the wedge faces of the remaining elements of said sets, said remaining friction elements having friction surfaces co-operating with said interior friction surfaces of the casing; means on said casings for effecting relative movement of said sets of elements during movement of said casings toward each other; and yielding means for resisting relative movement of said sets of elements.

3. In a friction shock absorbing mechanism, the combination with front and rear follower elements having longitudinally disposed friction surfaces thereon, said follower elements being relatively movable toward and away from each other; of a friction system co-operating with said elements, said system including a pair of friction shoes engaging the friction surfaces of the followers and a pair of wedge elements co-operating with the shoes, said wedge elements having interengaging faces inclined with respect to the longitudinal axis of the mechanism, said shoes being engaged and moved relatively to each other by said follower elements; and spring means interposed between each follower and the friction system.

4. In a friction shock absorbing mechanism, the combination with front and rear follower casings having longitudinally disposed surfaces thereon; of a friction shoe engaged by and moved with each follower casing and having frictional contact with one of the longitudinal surfaces of the other follower casing; a plurality of wedge members having wedging engagement with said shoes, said wedge members having interengaging friction surfaces inclined to the longitudinal axis of the mechanism; and spring means opposing relative movement of said wedge members and of said follower casings.

5. In a friction shock absorbing mechanism, the combination with front and rear follower casings; of a friction system co-operating with said casings, said system including a plurality of cooperating friction elements and wedge elements; means on said casings engaging certain of said elements and effecting relative movement thereof upon relative movement of said casings, said friction elements and casings having cooperating longitudinally disposed friction surfaces; and said wedge elements having inter-engaging friction surfaces extending lengthwise of the mechanism; and spring means interposed between the friction system and each follower casing.

6. In a friction shock absorbing mechanism, the combination with front and rear followers having longitudinally disposed surfaces thereon; of a friction system, said system including a plurality of friction shoe elements and wedge elements, certain of said elements having inter-engaging wedge faces disposed at a relatively keen wedge acting angle with reference to the longitudinal axis of the mechanism and the remaining elements having engaging faces disposed at a relatively blunt angle with reference to said axis, each of said shoe elements having frictional engagement with one of said longitudinally disposed surfaces; and said wedge elements having interengaging friction surfaces inclined to the longitudinal axis of the mechanism; means on said followers co-operating with said friction system to effect movement of said shoe elements and wedge elements and produce relative movement of said wedge elements; and spring resistance means opposing movement of all of said elements.

In witness that I claim the foregoing I have hereunto subscribed my name this 19th day of November, 1925.

JOHN F. O'CONNOR.